(12) United States Patent
Rowland et al.

(10) Patent No.: US 7,455,436 B2
(45) Date of Patent: *Nov. 25, 2008

(54) FLUSH-MOUNTED LIGHTING SYSTEM FOR VEHICLE

(75) Inventors: Edward R. Rowland, Etiwanda, CA (US); Thomas W. Hunsucker, Alta Loma, CA (US)

(73) Assignee: Lippert Components, Inc., Goshen, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/704,571

(22) Filed: Feb. 8, 2007

(65) Prior Publication Data

US 2007/0139942 A1    Jun. 21, 2007

Related U.S. Application Data

(63) Continuation of application No. 10/860,535, filed on Jun. 2, 2004, now Pat. No. 7,192,170.

(51) Int. Cl.
*B60Q 1/00* (2006.01)
(52) U.S. Cl. .................. 362/485; 362/477; 362/505
(58) Field of Classification Search ............... 362/485, 362/477, 505; 280/414.1
See application file for complete search history.

(56) References Cited

U.S. PATENT DOCUMENTS

| | | | |
|---|---|---|---|
| 4,290,098 A | 9/1981 | Pierson | |
| 4,644,449 A | 2/1987 | Smith-Williams | |
| 5,055,983 A | 10/1991 | Hunold et al. | |
| 5,325,271 A | 6/1994 | Hutchisson | |
| 5,335,155 A | 8/1994 | Hanson et al. | |
| 5,544,022 A * | 8/1996 | Blackard | 362/477 |
| 5,632,551 A | 5/1997 | Roney et al. | |
| 5,709,453 A | 1/1998 | Krent et al. | |
| 5,725,228 A * | 3/1998 | Livingston | 280/414.1 |
| 5,871,270 A | 2/1999 | Ricker et al. | |
| 5,980,073 A | 11/1999 | Whipple | |
| 6,409,367 B1 * | 6/2002 | Pratt | 362/505 |
| 6,439,589 B1 | 8/2002 | Payne | |
| 6,773,154 B2 | 8/2004 | Desai | |
| 7,017,933 B2 * | 3/2006 | Mickey | 280/414.1 |
| 7,192,170 B2 * | 3/2007 | Rowland | 362/485 |

\* cited by examiner

*Primary Examiner*—Anabel M Ton
(74) *Attorney, Agent, or Firm*—Fred C. Hernandez; Mintz, Levin, Cohn, Ferris, Glovsky, and Popeo PC

(57) ABSTRACT

Disclosed is a flush mounted lighting system for a vehicle. In one embodiment, the lighting system includes a frame member and a light member mounted in the frame member. The frame member is disposed within a portion of the vehicle so that the frame member is flushly mounted with an outer surface of the vehicle.

10 Claims, 7 Drawing Sheets

FLUSH-MOUNTED LIGHTING SYSTEM FOR VEHICLE

REFERENCE TO PRIORITY DOCUMENT

This application is a continuation of U.S. patent application Ser. No. 10/860,535, entitled "FLUSH-MOUNTED LIGHTING SYSTEM FOR VEHICLE", filed Jun. 2, 2004, now U.S Pat No. 7,192,170 by Edward R. Rowland and Thomas W. Hunsucker. Where permitted, the subject matter of the above-noted application is incorporated by reference in its entirety by reference thereto.

TECHNICAL FIELD

The present invention relates to lighting systems and, more particularly, the present invention relates to a light system for a vehicle.

BACKGROUND

Boating is a sport that is growing in popularity. A typical user of a boat takes great pride in his or her boat. This pride generally extends beyond the performance aspects of the boat and includes the look and feel of the boat. Consequently, boaters are spending an increased amount of time and money to ensure that their boats not only perform to a high standard, but also look as good as they perform. Toward this end, boaters are taking increased care to make sure that the boat's trailer also looks as good as the boat.

For towing purposes, a user of a boat will position the boat atop a boat trailer during transport of the boat. The boat trailer is typically comprised of a plurality of interconnected trusses that form a frame, atop which the boat can be positioned. Because the boat trailer is towed by a towing vehicle through city and highway roads, the boat trailer is considered a moving vehicle and has many of the features of a vehicle, including lighting systems. Conventional boat trailers have lights, such as brake lights, that are mounted on the trailer such that they protrude outward from the outside surface of the boat trailer. Although such lights serve a functional purpose of providing lighting to the trailer, they do not necessarily add any appeal to the aesthetics of the boat trailer.

It would be desirable for the boat trailer to have a lighting system that not only satisfies functional requirements but also provides an improvement to the look of the trailer.

SUMMARY

Disclosed is a flush mounted lighting system for a vehicle, such as a boat trailer. In one embodiment, the lighting system includes a frame member and a light member mounted in the frame member. The frame member is disposed within a portion of the vehicle so that the frame member is flushly mounted with an outer surface of the vehicle.

In one embodiment, the lighting system comprises a boat trailer lighting system. The lighting system includes a frame defining a first interior cavity, the frame having a size configured to fit within a mounting hole in a truss of the boat trailer, the frame having a flange bordering at least a portion of the interior cavity, wherein the flange abuts an outer surface of the truss to provide a flush appearance between the frame and the truss; and a first light member positioned within the first interior cavity of the frame. Also disclosed is a method of mounting the lighting system in a boat trailer.

Other features and advantages of the present invention should be apparent from the following description of various embodiments, which illustrate, by way of example, the principles of the invention.

DETAILED DESCRIPTION

Figure 1:
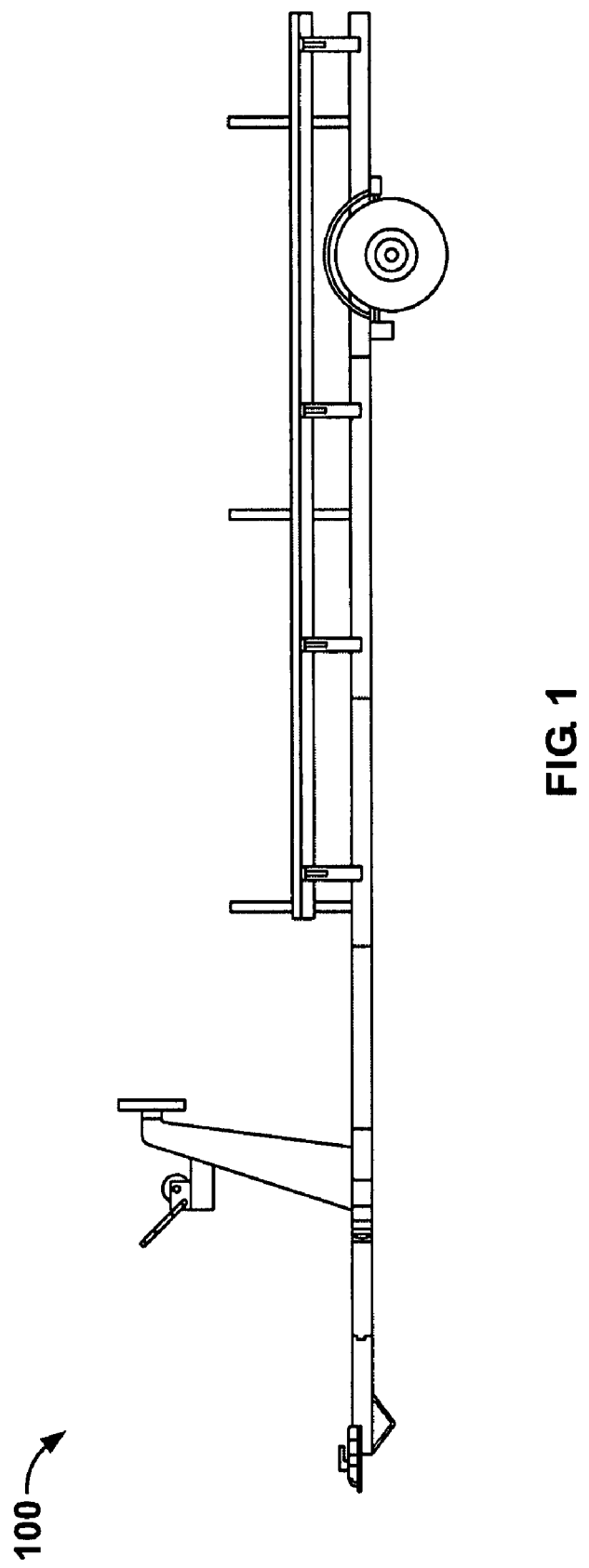
FIG. 1 is a side view of an exemplary vehicle comprised of a boat trailer that incorporates the disclosed flush-mounted lighting system.

FIG. 1 shows a side view of a vehicle comprised of a boat trailer 100 that incorporates the flush mounted lighting system described herein. It should be appreciated that the boat trailer 100 is exemplary and that the lighting system can be incorporated into other types of vehicles configured as described herein. With reference to FIG. 1, at least a portion of the boat trailer 100 is comprised of a plurality of interconnected trusses that collectively form a framework structure that forms the trailer 100.

Figure 2A:
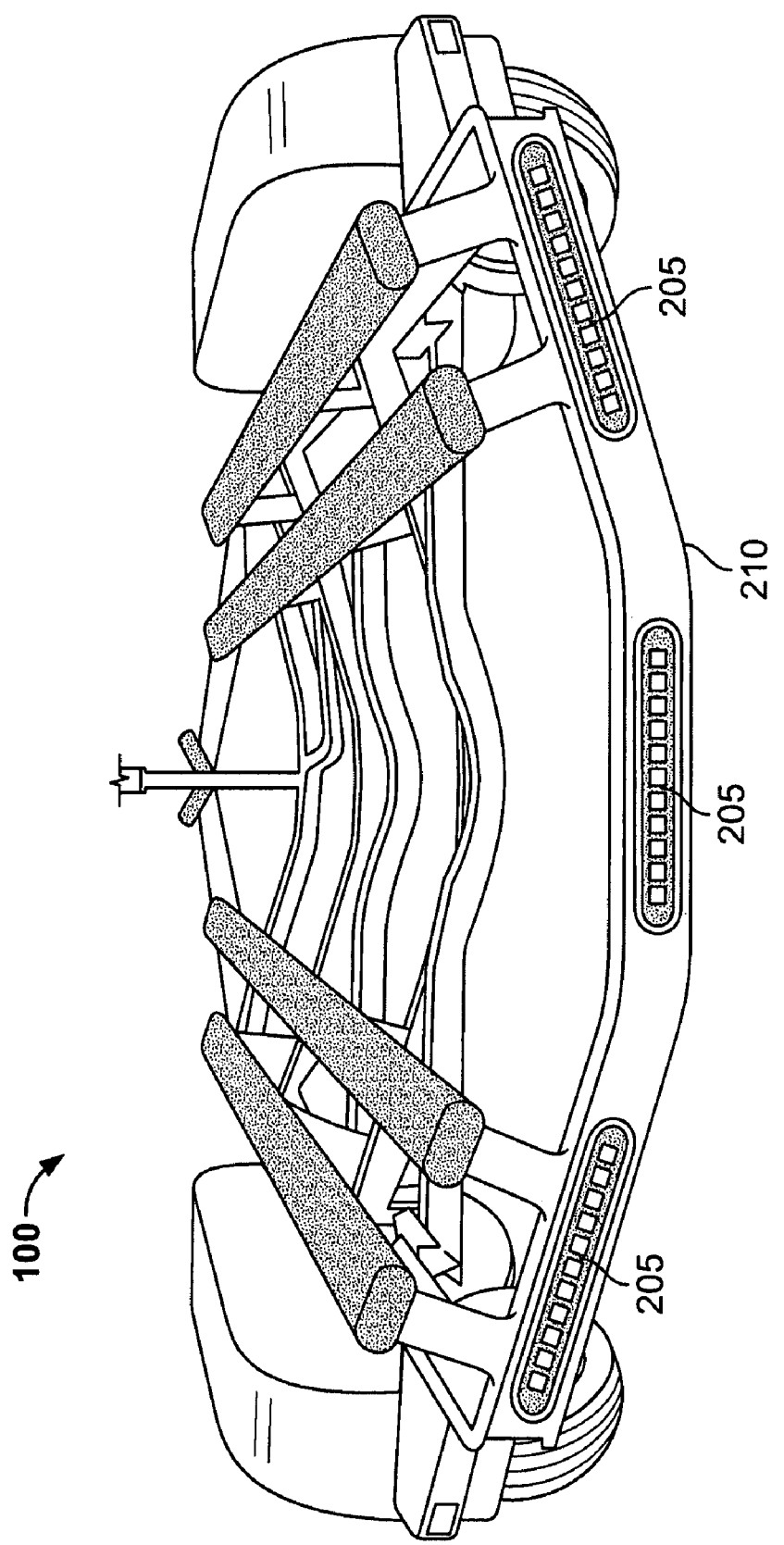
FIG. 2A is a rear view of the boat trailer showing the flush-mounted lighting system.
Figure 2B:
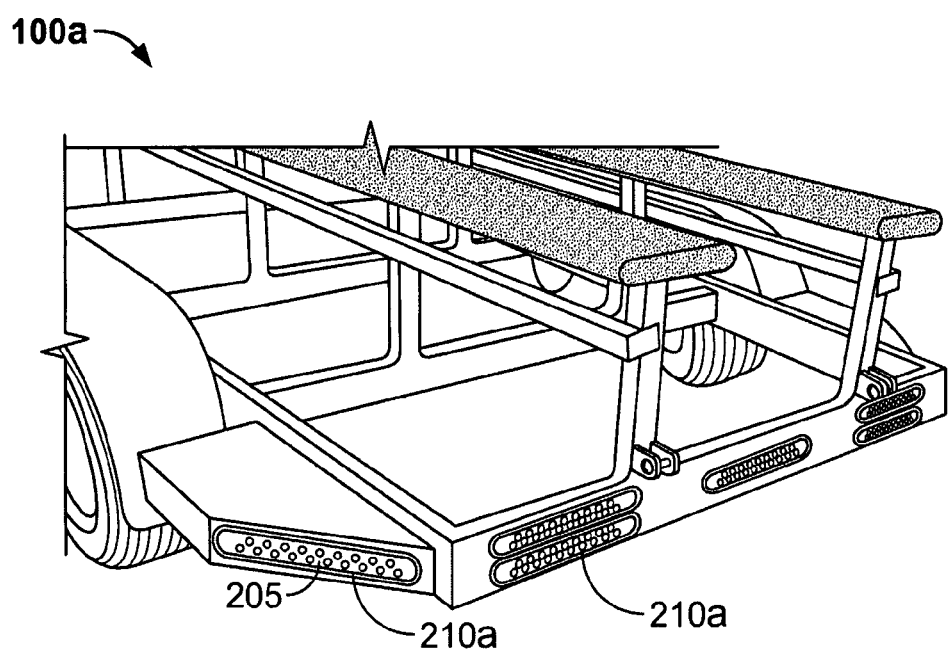
FIG. 2B is a rear view of a portion of another boat trailer with the flush-mounted lighting system.

FIG. 2A shows a rear view of the boat trailer 100, which includes a rear truss 210 that spans the width of the trailer 100. The rear truss 210 is positioned on the trailer 100 such that it would be viewable from a person or vehicle that is positioned directly behind the trailer. In this regard, the rear truss 210 is one possible location on the trailer 100 where tail lights or brake lights can be located. At least one flush-mounted light system 205 is located on the rear truss 210 such that the light system is facing rearward on the trailer 100. As described in more detail below, each light system 205 is comprised of one or more light members that emit or reflect light. The light members are positioned in a frame that is mounted in or on the trailer 100, such as within the truss 210, as shown in FIG. 2A. It should be appreciated that the light systems 205 need not be mounted on the rear of the trailer 100 and need not face directly rearward, but could also be mounted on other locations on the trailer 100 and could face in different directions. For example, FIG. 2B shows a different trailer 100*a* having a step region truss 210*a* on which is mounted a single light system 205. In the embodiment, shown in FIG. 2B, the light system 205 is facing at a diagonal relative to the rear of the trailer 100*a*.

Figure 3:
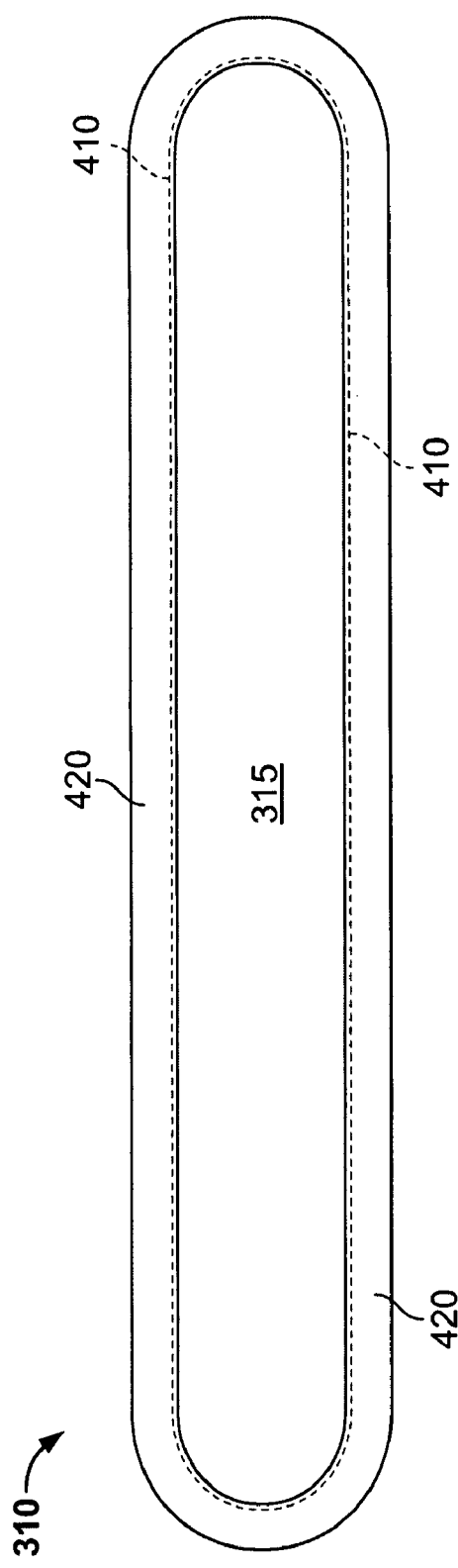
FIG. 3 is a front view a first embodiment of the frame.
Figure 4:
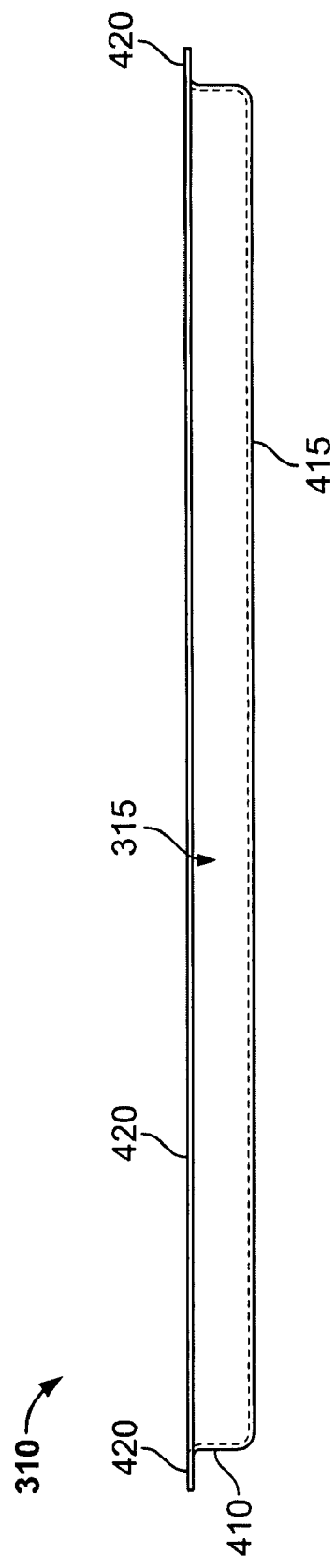
FIG. 4 is a side view of the first embodiment of the frame.

FIGS. 3 and 4 show front and side views, respectively, of a frame member 310 of the light system 205. The frame member 310 is configured to hold therein the light members, as described more fully below. The frame member 310 is shaped to define an internal cavity 315 that is sized and shape to receive therein a light member, as described more fully below. In the illustrated embodiment, the cavity has an elongate, oval or elliptical shape with curves at opposed, transverse ends when viewed from the front (FIG. 3). It should be appreciated, however, that the shape of the cavity can vary to correspond to various shapes of light members. For example, the cavity can be elongated, square, circular, oval, irregular, etc., as long as it is configured to receive therein a corresponding light member. In one embodiment, the light member has a shape that corresponds exactly to the shape of the cavity 315 in the frame 310. In another embodiment, the shape of the light member differs from the shape of the cavity 315, but the light member is shaped to fit within the cavity 315.

With reference to FIG. 4, the frame has an annular side wall 410 that surrounds the sides of the cavity 315. A rear wall 415 defines the rear periphery of the cavity 315. The front of the cavity 315 is open such that the light member, when mounted in the cavity, is viewable from the front of the frame. A front edge of the cavity 315 is surrounded by an annular lip or flange 420 that is generally parallel to the rear wall 415. One or more holes (not shown) can be located on the side wall 410 or rear wall 415 through which electrical wires can extend for providing electrical power to the light member(s) positioned in the cavity 315.

Figure 5:
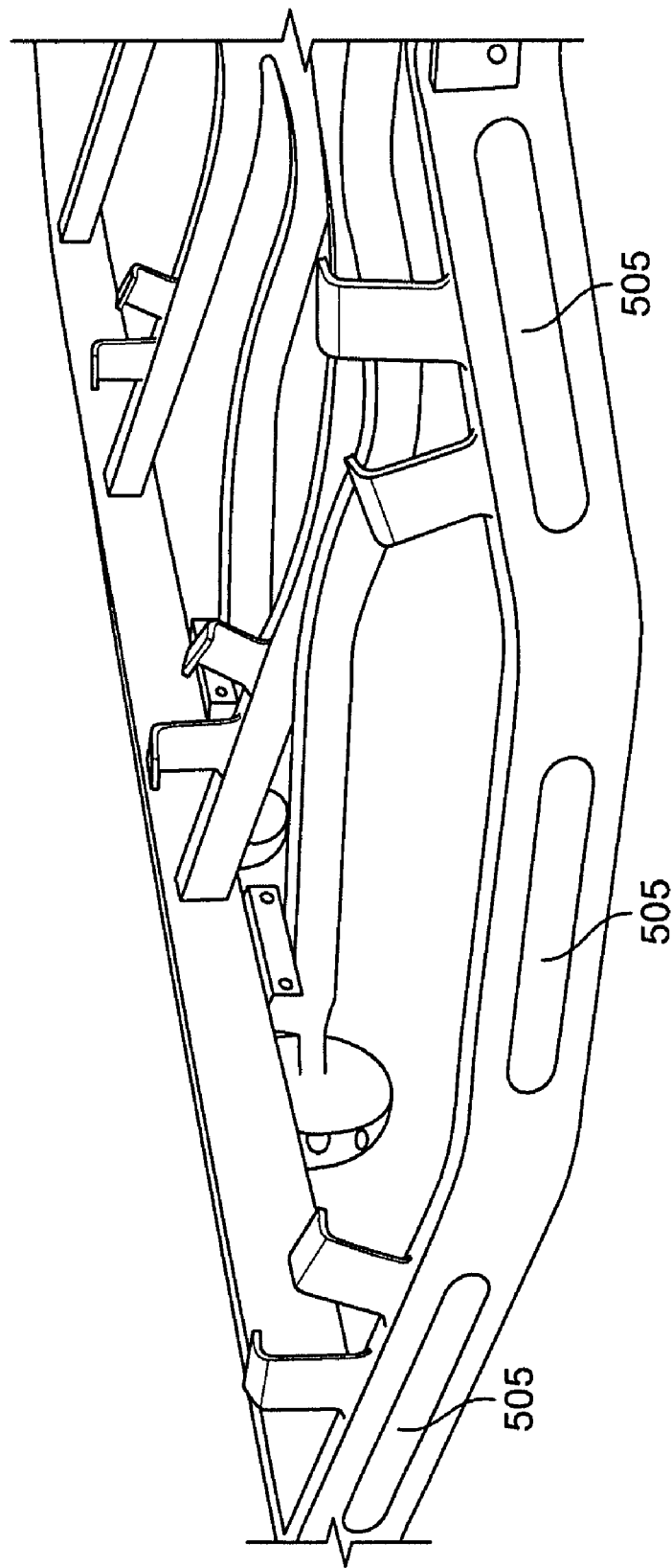
FIG. 5 shows a rear view of the trailer prior to installation of the light systems.

FIG. 5 shows another rear view of the trailer 100 prior to installation of the light systems 205 therein. The rear truss 210 has a plurality of mounting holes 505, wherein each hole is sized to receive therein a corresponding frame member 310 for a light system. In this regard, the mounting holes 505 can have a shape that substantially corresponds to the shape of the front silhouette of the frame. For example, if the frame is oval, then the holes 505 are also oval and if the frame is square then the holes 505 are square. It should be appreciated, however, that the shape of the mounting holes 505 can vary. The rear truss 210 has a hollow configuration such that the mounting holes 505 provide access to an internal cavity in the truss in which the frame of the lighting system can be positioned. The hollow configuration of the trusses also permits one or more electrical wires to be run through the trusses. The wires provide electrical energy to the light emitting members of the light systems.

With reference still to FIG. 5, the holes 505 are sized such that the side wall 410 and the rear wall 415 portion of the frame member 310 (shown in FIGS. 3 and 4) can be inserted through the hole. However, the holes 505 are sized such that the flange 420 is slightly larger than the hole 505 such that the flange 420 abuts the outer surface of the rear truss 210 when the frame members 310 are inserted into the respective holes 505.

Figure 6:
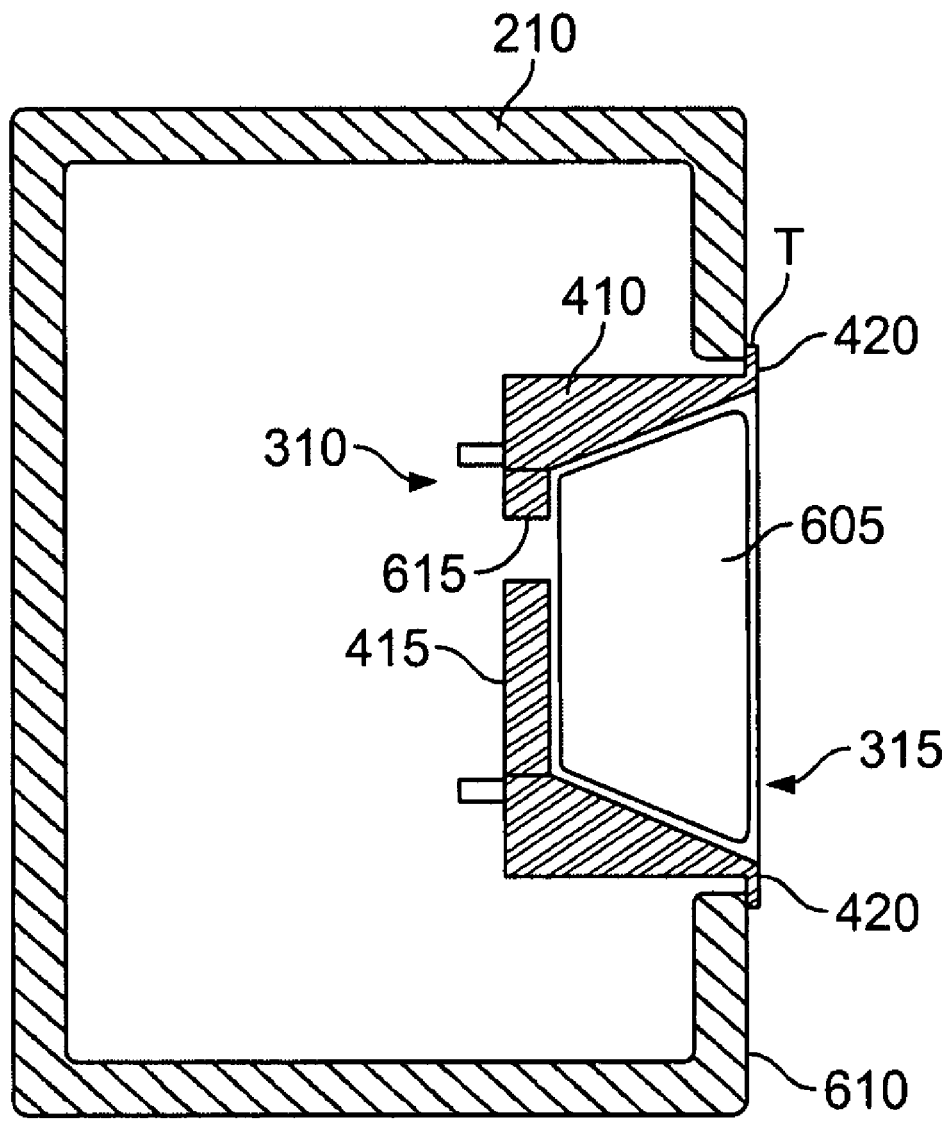
FIG. 6 shows a cross-sectional view of a rear truss of the trailer with a frame member of the light system mounted therein.

A side, cross-sectional view of a portion of the rear truss showing another embodiment of the frame member 310 mounted therein is shown in FIG. 6. When the frame member 310 is inserted into the hole 505, the flange 420 sits against the outer surface 610 of the rear truss 210. The flange desirably has a thickness T that is small relative to the width of the truss such that the flange 420 provides the appearance of being flush with the surface of the truss when the frame is mounted in the hole 505. In one embodiment, the flange has a thickness of approximately 0.06 inches, although it should be appreciated that the thickness of the flange 420 can vary. In one embodiment, the light member is sized such that it does not protrude past the outer surface of the truss in which it is positioned in order to preserve the flush appearance of the lighting system.

It should be appreciated that FIG. 6 is not necessarily drawn to scale. FIG. 6 shows a different embodiment of the frame member 310, in which the side walls 410 are thicker than in the previous embodiment. In addition, the side walls 410 have a sloped, internal surface such that the cavity 315 has an inclined shape moving rearward trough the cavity. The cavity 315 can have various shapes configured to receive the light member.

With reference still to FIG. 6, the light member 605 has a shape that is configured to fit within the cavity 315. In illustrated embodiments, the light member 605 is elongated such that it substantially conforms to the elongated shape of the cavity 315. The light member 605 can include a single elongated light device, such as an elongated light bulb or fluorescent light, that spans the length of the cavity 315, or it can have a series of smaller light devices that are consecutively disposed along the length of the cavity 315. The light member 605 can be secured in the cavity 315 using any type of securing means, such as a screw, a nut and bolt configuration, or adhesive. As mentioned, the light member 605 can be powered so to emit light. The frame 310 can have one or more holes 615 through which electrical wires can communicate with the light member 605.

The frame member 310 can be manufactured of any of a variety of materials. In one embodiment, the frame member 310 is manufactured of stainless steel. In another embodiment, the frame member is manufactured of a thermoplastic. The frame member 310 can be secured to the trailer 100 in a variety of manners. In one embodiment, one or more securing members, such as a screw or a nut and bolt assembly is used to secure the frame member 310 to the trailer. In another embodiment, an adhesive is used to secure the frame member 310 to the trailer.

Figure 7:
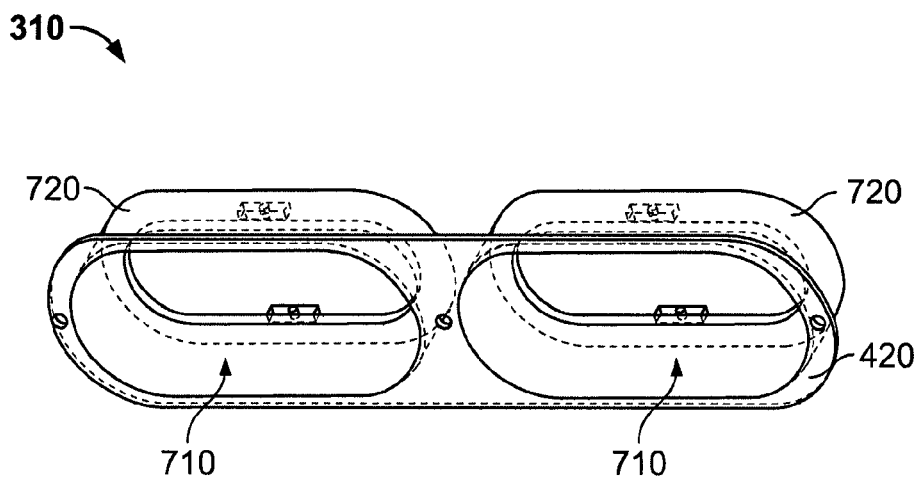
FIG. 7 is a front, perspective view of a second embodiment of a frame of the lighting system.
Figure 8:
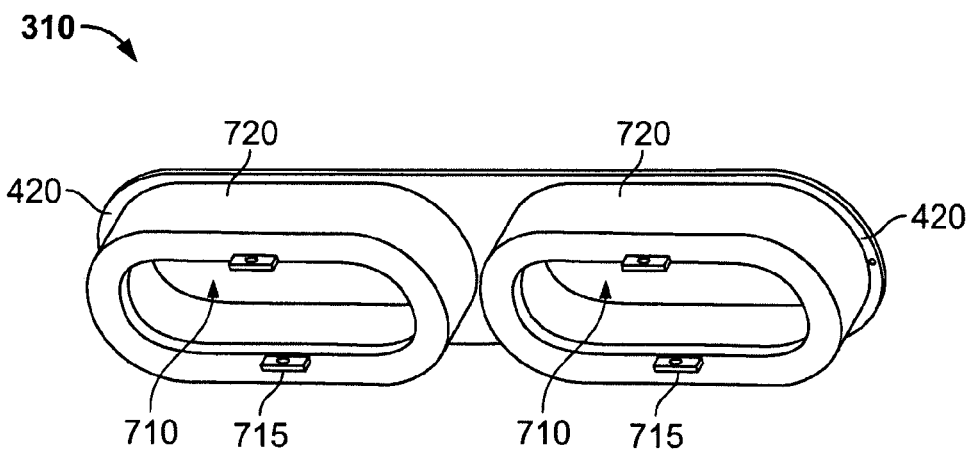
FIG. 8 is a rear, perspective view of the second embodiment of the frame.

It should be appreciated that the shape and configuration of the light system, including the frame member, can vary. FIGS. 7 and 8 show front and rear views of another embodiment of the frame member 310. In this embodiment, the frame member 310 has a pair of cavities 710 that are each sized to receive therein at least one corresponding light member, which can be secured to the frame member using a nut/bolt arrangement that interfaces with an attachment member, such as a tab 715, on the frame member. Each cavity 710 is surrounded by an annular side wall 720 that encloses the sides of the cavity and that provides a location on which the light members can sit. The cavity 710 in the embodiment shown in FIGS. 7-8 is not enclosed by a rear wall. As in the previous embodiment, the frame member 310 has an annular lip or flange 420. It should be appreciated that the configuration and quantity of the cavities can vary to provide additional locations where light members can be mounted in the frame member.

Although embodiments of various methods and devices are described herein in detail with reference to certain versions, it should be appreciated that other versions, embodiments, methods of use, and combinations thereof are also possible. Therefore the spirit and scope of the appended claims should not be limited to the description of the embodiments contained herein.

What is claimed:

1. A lighting system for a boat trailer formed of a plurality of interconnected trusses, comprising:

a frame having a length and a depth and defining a first interior cavity, the frame having a size configured to fit within a mounting hole in a truss of the boat trailer such that the frame is recessed within the truss, the frame having a flange bordering at least a portion of the first interior cavity, wherein the flange abuts and is co-planar with an external surface of the truss to provide a flush appearance between the frame and the external surface of the truss, wherein the depth of the frame is significantly less than the length of the frame; and a first light member positioned within the first interior cavity of the frame.

2. The system of claim 1, wherein the first light member is electrically-powered.

3. The system of claim 1, wherein the first light member reflects light.

4. The system of claim 1, wherein the frame includes an annular side wall that encloses the sides of the first interior cavity.

5. The system of claim 1, wherein the frame includes a rear wall that encloses a rear of the first interior cavity.

6. The system of claim 1, wherein the first interior cavity of the frame has an oval shape.

7. The system of claim 1, wherein the frame includes a second interior cavity and further comprising a second light member positioned within the second interior cavity.

8. The system of claim 1, wherein the frame has a height and wherein the height of the frame is significantly less than the length of the frame.

9. A method of positioning a light system in a boat trailer formed of a plurality of interconnected trusses, comprising:
   providing a light system comprising:
   (a) a frame having a length and a depth and defining a first interior cavity, the frame having a size configured to fit within a mounting hole in a truss of the boat trailer such that the frame is recessed within the truss, the frame having a flange bordering at least a portion of the first interior cavity, wherein the flange abuts and is co-planar with an external surface of the truss to provide a flush appearance between the frame and the external surface of the truss, wherein the depth of the frame is significantly less than the length of the frame; and
   (b) a first light member positioned within the first interior cavity of the frame; and
   mounting the frame directly within the mounting hole of the truss and not within a separate structure attached to the truss such that the flange abuts and is co-planar with the external surface of the truss to provide a flush appearance between the external surface of the truss and the frame.

10. A boat trailer, comprising:
    a plurality of interconnected trusses that collectively form a support structure adapted to support a boat;
    a frame having a length and a depth and defining a first interior cavity, the frame having a size configured to fit within a mounting hole in a truss of the boat trailer such that the frame is recessed within the truss, the frame having a flange bordering at least a portion of the first interior cavity, wherein the flange abuts and is co-planar with an external surface of the truss to provide a flush appearance between the frame and the external surface of the truss, wherein the depth of the frame is significantly less than the length of the frame; and
    a first light member positioned within the first interior cavity of the frame.

* * * * *